(12) United States Patent
Rothkopf et al.

(10) Patent No.: US 8,893,373 B2
(45) Date of Patent: Nov. 25, 2014

(54) METHOD FOR ASSEMBLING A PORTABLE ELECTRONIC DEVICE

(76) Inventors: Fletcher R. Rothkopf, Los Altos, CA (US); Phillip M. Hobson, Menlo Park, CA (US); Christopher M. Werner, San Jose, CA (US)

( * ) Notice: Subject to any disclaimer, the term of this patent is extended or adjusted under 35 U.S.C. 154(b) by 185 days.

(21) Appl. No.: 13/594,767

(22) Filed: Aug. 24, 2012

(65) Prior Publication Data

US 2014/0053392 A1    Feb. 27, 2014

(51) Int. Cl.
*G01R 31/28*    (2006.01)

(52) U.S. Cl.
USPC ............ 29/593; 29/592.1; 29/602.1; 29/705; 361/679.01; 361/679.3; 361/679.55; 361/688

(58) Field of Classification Search
CPC ............ H04M 1/0249; H04M 1/0266; H04M 1/0274; H04M 1/0277; H04M 1/0295; H04M 1/24; H05K 5/0017; H05K 5/0086; H05K 13/08
USPC ......... 29/592.1, 593, 602.1, 705; 361/679.01, 361/679.3, 679.55, 688
See application file for complete search history.

(56) References Cited

U.S. PATENT DOCUMENTS

| 7,558,054 | B1 * | 7/2009 | Prest et al. ................. 361/679.3 |
| 7,869,206 | B2 * | 1/2011 | Dabov et al. ............. 361/679.55 |
| 7,933,123 | B2 * | 4/2011 | Wang et al. ............. 361/679.56 |
| 8,632,363 | B2 * | 1/2014 | Jol ............................ 439/607.4 |
| 2012/0050988 | A1 * | 3/2012 | Rothkopf et al. ............. 361/688 |
| 2012/0051025 | A1 * | 3/2012 | Jol et al. ........................ 361/818 |
| 2012/0053711 | A1 * | 3/2012 | Shedletsky et al. ............. 700/94 |

* cited by examiner

*Primary Examiner* — Paul D Kim
(74) *Attorney, Agent, or Firm* — Womble Carlyle Sandridge & Rice LLP (57) ABSTRACT

An assembly method suitable for assembling a portable electronic device having a housing with an undercut portion is disclosed. The method includes aligning a non-display portion of a display assembly with the undercut portion of the housing, the display assembly comprising a display, a protective top layer covering a top side of the display portion and the non-display portion and a battery module attached to an underside of the display assembly, electrically connecting the battery to a circuit previously installed in the housing, angling the display assembly in relation to a front opening of the housing in a tilted configuration such that the non-display portion is partially inserted into the undercut portion of the housing, and in the tilted configuration, performing a pre-install functional test on the display and fully inserting the display assembly into the housing only when the pre-install functional test is successfully completed.

11 Claims, 5 Drawing Sheets

ND FOR ASSEMBLING A PORTABLE
METHOD FOR ASSEMBLING A PORTABLE ELECTRONIC DEVICE

TECHNICAL FIELD

The present invention relates generally to portable computing devices. More particularly, the present embodiments relate to tilting components into enclosures in portable computing devices.

BACKGROUND

Portable computing devices have grown in popularity and capability. Early uses for portable computing devices were often limited to simple computing tasks such as number manipulation and word processing. Present applications can include advanced graphical rendering, musical composition, movie and music presentation and more.

In order to support the ever expanding list of applications desired by users, portable computing devices are including more sophisticated components into the space defined by the enclosure of the device. While users expect more performance and features from their portable computing devices, users also want a compact unit; that is, users want the enclosure to be as compact as feasible.

The components within the enclosure can include a flat-panel display visible through glass that is situated in an opening in the enclosure, a touch panel, a circuit board, a battery, speakers, microphones, and others. The components can be connected together to form modules, such as a display module formed by attaching the touch panel to the display and the glass to the touch panel, and the modules can be placed in the enclosure when the device is assembled.

The display can have a border area that does not have pixels and therefore does not display an image. Display drivers occupy the space in the border area, particularly along one side of the display, which can have a larger border than the other three sides. The larger border results in an asymmetry in the display, but the larger border can be covered by extending the glass to the appropriate size.

SUMMARY

The present application describes various embodiments regarding systems and methods for incorporating display assemblies into a portable computing device by tilting the display assemblies.

A display assembly, which includes a glass panel, a touch panel, a flat-panel display, and a battery, is tilted into the interior of a device housing. The housing is small enough to comfortably fit in a person's hand, and it is desirable to reduce or minimize the sizes of many of the components of the device. For example, the display has a border region in which there are no display pixels. The border region is also referred to herein as a ledge. The ledge contains drivers for the pixels, but there is no need for the ledge to be visible to users. The ledge of the display is tilted into an undercut region, e.g., at an inside upper corner of the housing. Placing the display in this location, with at least a portion of the display extending into the undercut region, results in the ledge being hidden from a user's view. This arrangement results in reduced device size by allowing for reduction in the size of the glass panel. The device can be tested with the display assembly partially tilted into the housing after connecting the battery to a circuit board in the housing but before closing off access to the circuit board by placing the housing in its final position. A metal frame can also be tilted into the housing, e.g., as part of the display assembly, and portions of the frame can be placed in the undercut regions to provide rigidity to the device.

An assembly method suitable for assembling a portable electronic device is disclosed. The portable electronic device can include a housing with an undercut portion. Assembling and testing the portable electronic device can include aligning a non-display portion of a display assembly with the undercut portion of the housing, the display assembly including a display, a protective top layer covering a top side of the display portion and the non-display portion and a battery module attached to an underside of the display assembly, electrically connecting the battery to a circuit previously installed in the housing, angling the display assembly in relation to a front opening of the housing in a tilted configuration such that the non-display portion is partially inserted into the undercut portion of the housing, and in the tilted configuration, performing a pre-install functional test on the display assembly, and fully inserting the display assembly into the housing only when the pre-install functional test is successfully completed.

Assembling and testing can further include disconnecting the battery from the circuit in response to failure of the pre-install functional test, obtaining a replacement component for at least one component of the display assembly, and replacing the at least one component of the display assembly with the replacement component. The method can include repeating the aligning, electrically connecting, angling, and testing using the display assembly having the replacement component, and fully inserting the display assembly having the replacement component into the housing only when the pre-install functional test is successfully completed. The method can include electrically connecting a test instrument cable to the circuit in the housing.

Performing a pre-install functional test on the display assembly can include sending one or more test instructions to the circuit in the housing via the test instrument cable, receiving test results from the circuit, and determining, based upon the test results, whether the functional test is successfully completed. The method can further include placing an object on the housing at a location between the housing and the display assembly, and supporting the display assembly in the tilted configuration with the object during the pre-install functional test. Aligning a non-display portion of a display assembly with the undercut portion of the housing can include attaching an articulation arm to the protective top layer of the display assembly, moving the display assembly into a position above the opening in the housing the articulation arm, and aligning edges of the display with edges of the opening.

Angling the display assembly can include tilting the display assembly through the opening around an axis located in the undercut region until the display assembly rests on a lower surface of the housing and on a test block located on an upper surface of the housing. Fully inserting the display assembly can include removing the testing block, and moving the display assembly horizontally toward the undercut region and continuing the tilting until the assembly is in a horizontal position, and at least a portion of the assembly is in the undercut region. The non-display portion can include a driver ledge. The driver ledge can extend into the undercut region, and the housing can be at least partially formed from an opaque material that covers the ledge.

A robotic assembly apparatus suitable for assembling a portable electronic device is disclosed. The portable electronic device can have a housing with an undercut portion accessible through an opening in the housing. The assembly apparatus includes a robotic assembler. To assemble the portable electronic device, the assembler selects a display assembly, identifies a location of the undercut region in the housing, attaches an articulation arm to a protective layer of the display assembly, moves the display assembly into a position above the opening in the housing the articulation arm, aligns edges of the display with edges of the opening, electrically attaches the display assembly to a circuit in the housing, tilts the display assembly through the opening around an axis located in the undercut region until the display assembly rests on a lower surface of the housing and is held in place by a support feature, performs a functional test on the display assembly, and in response to successful completion of the functional test, moves the display assembly horizontally toward the undercut region and continues the tilting until the assembly is in a horizontal position, and at least a portion of the assembly is in the undercut region.

In response to successful completion of the functional test, the assembler can move the display assembly horizontally through the undercut region until the display assembly is adjacent to a right-side interior sidewall. The assembler can identify a non-display portion of the display, and in response to successful completion of the functional test, move the display assembly horizontally toward the undercut region and continue the tilting until the assembly is in a horizontal position, and at least a portion of the non-display portion of the display is in the undercut region.

The assembler can disconnect the display assembly from the circuit in response to failure of the pre-install functional test, obtain a replacement display assembly, and replace the display assembly with the replacement display assembly. The assembler can repeat the moving, aligning, tilting, and testing using the replacement display assembly, and in response to successful completion of the functional test, move the display assembly horizontally toward the undercut region and continues the tilting until the assembly is in a horizontal position and at least a portion of the assembly is in the undercut region. The non-display portion can include a driver ledge. The driver ledge can extend into the undercut region, and the housing can be at least partially formed from an opaque material that covers the ledge. To perform a functional test on the display assembly, the assembler can send one or more test instructions to the circuit in the housing via the test instrument cable, receive test results from the circuit, and determines, based upon the test results, whether the functional test is successfully completed. The support feature can include a test block, and the robot assembler can place the test block on an upper surface of the housing.

Other apparatuses, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The included drawings are for illustrative purposes and serve only to provide examples of possible structures and arrangements for the disclosed inventive apparatuses and methods for providing portable computing devices. These drawings in no way limit any changes in form and detail that may be made to the invention by one skilled in the art without departing from the spirit and scope of the invention. The embodiments will be readily understood by the following detailed description in conjunction with the accompanying drawings, wherein like reference numerals designate like structural elements, and in which.

DETAILED DESCRIPTION

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The following relates to a portable computing device such as a laptop computer, net book computer, tablet computer, etc. The portable computing device can include a multi-part housing having a top case and a bottom case joining at a reveal to form a base portion. The portable computing device can have an upper portion (or lid) that can house a display screen and other related components whereas the base portion can house various processors, drives, ports, battery, keyboard, touchpad and the like. The base portion can be formed of a multipart housing that can include top and bottom outer housing components each of which can be formed in a particular manner at an interface region such that the gap and offset between these outer housing components are not only reduced, but are also more consistent from device to device during the mass production of devices. These general subjects are set forth in greater detail below.

The following describes embodiments of a display assembly well suited for use with a portable electronic device. In particular, the portable electronic device can have a housing with a geometry that can make assembly of the portable electronic device difficult. More specifically, the housing can be shaped to have an undercut geometry, by which it is meant that the housing has a largest lateral dimension that is greater than a front opening used to insert components during an assembly operation. This dimensional disparity can result in a time consuming assembly operation, since installing components having dimensions larger than the front opening and yet fitting within the housing can be difficult. One solution to this problem has been to use a tilt type assembly whereby the large component is tilted into place within the housing. However, this solution generally makes it difficult to access components (such as a main logic board, or MLB) already in place, and makes pre-assembly testing unfeasible.

Accordingly, in accordance with one described embodiment, a display assembly is described that is well suited for use with a portable electronic device having an undercut geometry. In one embodiment, the display assembly can include a glass panel, a touch panel, a flat-panel display, and a battery mounted to an underside of the flat panel display. In this way, the display assembly can be tilted into the interior of a device housing having an undercut geometry during an assembly operation. In the described embodiments, the display assembly has a border region in which there are no display pixels. The border region is also referred to herein as a ledge. The ledge contains drivers for the pixels, but there is no need for the ledge to be visible to users. In this way, the ledge of the display assembly can be tilted into the undercut region, e.g., at an inside upper corner of the housing. Placing the display in this location, with at least a portion of the display extending into the undercut region, results in the ledge being hidden from a user's view. This arrangement results in reduced device size by allowing for reduction in the size of the glass panel. The device can be tested with the display assembly partially tilted into the housing after connecting the battery to a circuit board in the housing, and prior to closing off access to the circuit board by placing the housing in its final position. In some embodiments, a metal frame can also be tilted into the housing, e.g., as part of the display assembly, and portions of the frame can be placed in the undercut regions to provide rigidity to the device.

These and other embodiments are discussed below with reference to FIGS. 1A-5. However, those skilled in the art will readily appreciate that the detailed description given herein with respect to these figures is for explanatory purposes as the invention extends beyond these limited embodiments.

Figures 1A, 1B:
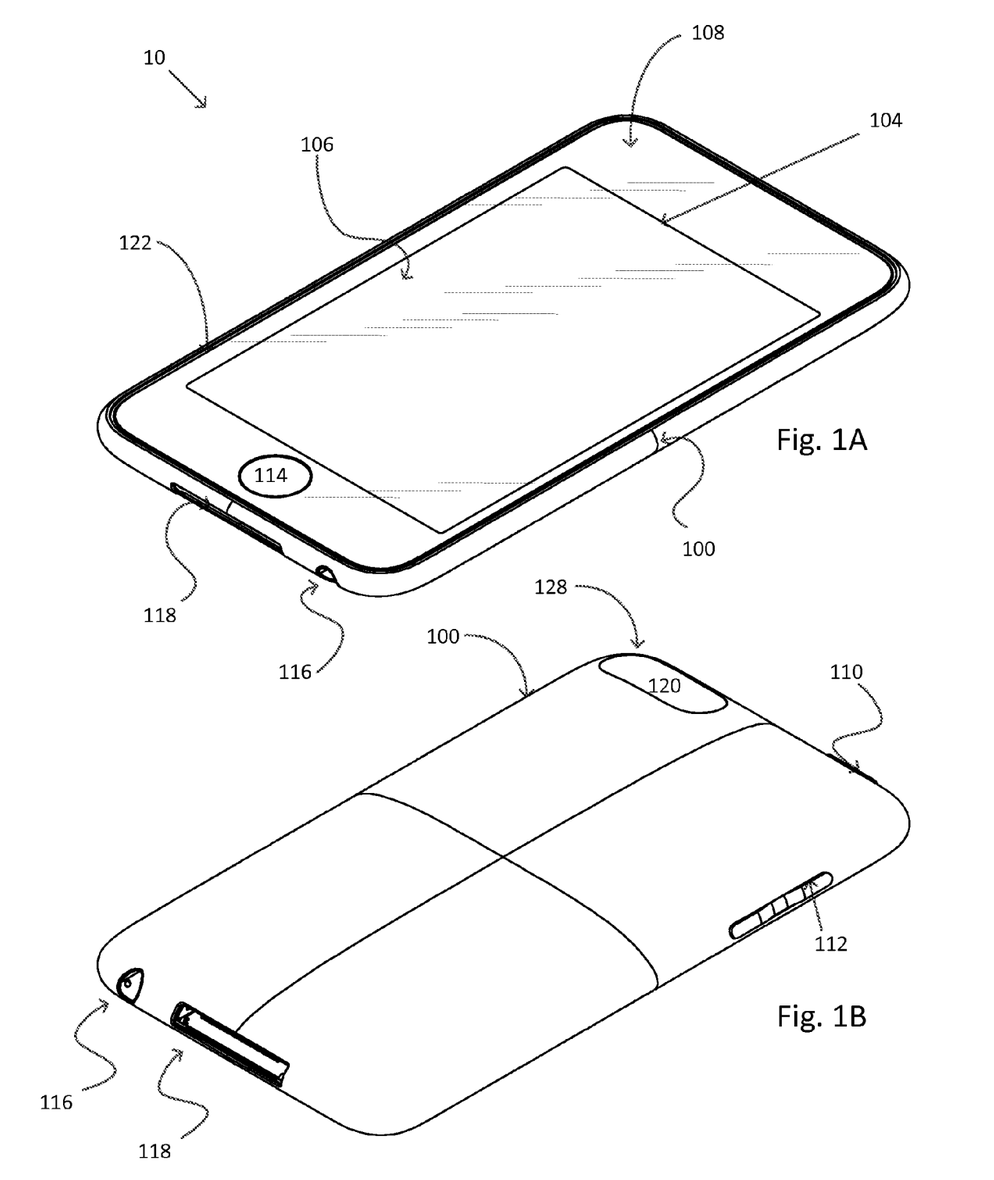
FIGS. 1A-1B are perspective diagrams showing various views of fully assembled portable electronic device 10 in accordance with one or more embodiments.

FIGS. 1A-1B are perspective diagrams showing various views of fully assembled portable electronic device 10 in accordance with one or more embodiments. The portable electronic device 10 may be sized for one-handed operation and placement into small areas such as a pocket, i.e., the portable electronic device 10 can be a handheld pocket sized electronic device. By way of example, the electronic portable electronic device 10 may correspond to a computer, media device, telecommunication device and/or the like. The portable electronic device 10 is capable of processing data and more particularly media such as audio, video, images, etc. The portable electronic device 10 may generally correspond to a music player, game player, video player, personal digital assistant (PDA), and/or the like. With regards to being handheld, the portable electronic device 10 can be operated solely by the user's hand(s), i.e., no reference surface such as a desktop is needed. In some cases, the handheld device is sized for placement into a pocket of the user. By being pocket sized, the user does not have to directly carry the device and therefore the device can be taken almost anywhere the user travels (e.g., the user is not limited by carrying a large, bulky and heavy device).

The portable electronic device 10 may be widely varied. In some embodiments, portable electronic device 10 may perform a single function (e.g., a device dedicated to playing and storing media) and, in other cases, the electronic device may perform multiple functions (e.g., a device that plays/stores media, receives/transmits telephone calls/text messages/internet, and/or performs web browsing). In some embodiments, the portable electronic device 10 is capable of communicating wirelessly (with or without the aid of a wireless enabling accessory system) and/or via wired pathways (e.g., using traditional electrical wires). In some embodiments, the portable electronic device 10 may be extremely portable (e.g., small form factor, thin, low profile, lightweight). In some cases, the portable electronic device 10 may be sized for being handheld. The portable electronic device 10 may even be sized for one-handed operation and placement into small areas such as a pocket, i.e., the portable electronic device 100 can be a handheld pocket sized electronic device.

By way of example, the portable electronic device 10 may correspond to consumer electronic products such as computers, media players, personal digital assistants (PDA), telecommunication devices (phone), personal e-mail or messaging devices and/or the like. In one example, the electronic device may correspond to any of those electronic devices an iPod™, an iPod Nano™, an iPod Shuffle™, an iPod™ Touch or an iPhone™ available by Apple Inc. of Cupertino, Calif.

The portable electronic device 10 includes a housing 100 configured to at least partially enclose any suitable number of components associated with the electronic portable electronic device 10. For example, the housing may enclose and support internally various electrical components (including integrated circuit chips and other circuitry) to provide computing operations for the device. The integrated circuit chips and other circuitry may include a microprocessor, memory, a battery, a circuit board, I/O, various input/output (I/O) support circuitry and the like. Although not shown in this figure, the housing 100 may define a cavity within which the components may be positioned and housing 100 also may physically support any suitable number of mechanisms, within housing 100 or within openings through the surface of housing 100.

In addition to the above, the housing may also define at least in part the outward appearance of portable electronic device 10. That is, the shape and form of the housing 100 may help define the overall shape and form of the portable electronic device 10 or the contour of the housing 100 may embody the outward physical appearance of the portable electronic device 10. Any suitable shape may be used. In some embodiments, the size and shape of the housing 100 may be dimensioned to fit comfortably within a user's hand. In some embodiments, the shape includes a slightly curved back surface and highly curved side surfaces. In other embodiments, the shape includes a flat back surface and flat side surfaces. The shape will be described in greater detail below.

In one embodiment, the housing 100 is integrally formed in such as way as to constitute is a single complete unit. By being integrally formed, the housing 100 has a seamless appearance unlike conventional housings that include two parts that are fastened together thereby forming a reveal, a seam there between. That is, unlike conventional housings, the housing 100 does not include any breaks thereby making it stronger and more aesthetically pleasing.

The housing 100 can be formed of any number of materials including for example plastics, metals, ceramics and the like. In one embodiment, housing 100 can be formed of stainless steel in order to provide an aesthetic and appealing look and feel as well as provide structural integrity and support for all sub-assemblies installed therein. When metal, the housing 100 can be formed using conventional collapsible core metal forming techniques well known to those skilled in the art.

The portable electronic device 10 also includes a cover 106 that includes a planar outer surface. The outer surface may for example be flush with an edge of the housing wall that surrounds the edge of the cover. The cover 106 cooperates with the housing 100 to enclose the portable electronic device 10. Although the cover can be situated in a variety of ways relative to the housing, in the illustrated embodiment, the cover 106 is disposed within and proximate the mouth of the cavity of the housing 100. That is, the cover 106 fits into an opening 108. In an alternate embodiment, cover 106 may be opaque and may include touch sensing mechanism that forms a touch pad. Racetrack 122 is defined as the uppermost portion of the housing 100 that surrounds the polished top glass layer 106. In order to maintain the desired aesthetic look and feel of the portable electronic device 10, it is desirable that any offsets between the housing 100 and the polished top glass layer 106 be minimized and the racetrack 122 be centered.

The cover 106 may be configured to define/carry the user interface of the electronic device 10. The cover 106 may for example provide a viewing region for a display screen 104 used to display a graphical user interface (GUI) as well as other information to the user (e.g., text, objects, graphics). The display screen 104 may be part of a display unit (not shown) that is assembled and contained within the housing 100. The display unit may for example be attached internally to a metal frame. The cover may also provide a user clickable input button 114 (home button) that can be used to provide a user input event to the portable electronic device 10. Such user input events can be used for any number of purposes, such as resetting the portable electronic device 10, selecting between display screens presented on display screen 104, and so on. In one embodiment, the cover 106 is a protective top layer of transparent or semitransparent material (clear) such that the display screen 104 is visible therethrough. That is, the cover 106 serves as a window for the display screen 104 (i.e., the transparent cover overlays the display screen). In one particular embodiment, the cover is formed from glass (e.g., cover glass), and more particularly highly polished glass. It should be appreciated, however, that other transparent materials such as clear plastic may be used.

In one embodiment, the viewing region may be touch sensitive for receiving one or more touch inputs that help control various aspects of what is being displayed on the display screen. In some cases, the one or more inputs can be simultaneously received (e.g., multi-touch). In these embodiments, a touch sensing layer (not shown) can be located below the cover glass 106. The touch sensing layer may for example be disposed between the cover glass 106 and the display screen 104. In some cases, the touch sensing layer is applied to the display screen 104 while in other cases the touch sensing layer is applied to the cover glass 106. The touch sensing layer may for example be attached to the inner surface of the cover glass 106 (printed, deposited, laminated or otherwise bonded thereto). The touch sensing layer generally includes a plurality of sensors that are configured to activate as the finger touches the upper surface of the cover glass 106. In the simplest case, an electrical signal is produced each time the finger passes a sensor. The number of signals in a given time frame may indicate location, direction, speed and acceleration of the finger on the touch sensitive portion, i.e., the more signals, the more the user moved his or her finger. In most cases, the signals are monitored by an electronic interface that converts the number, combination and frequency of the signals into location, direction, speed, and acceleration information. This information may then be used by the portable electronic device 10 to perform the desired control function relative to the display screen 104.

Figure 1C:
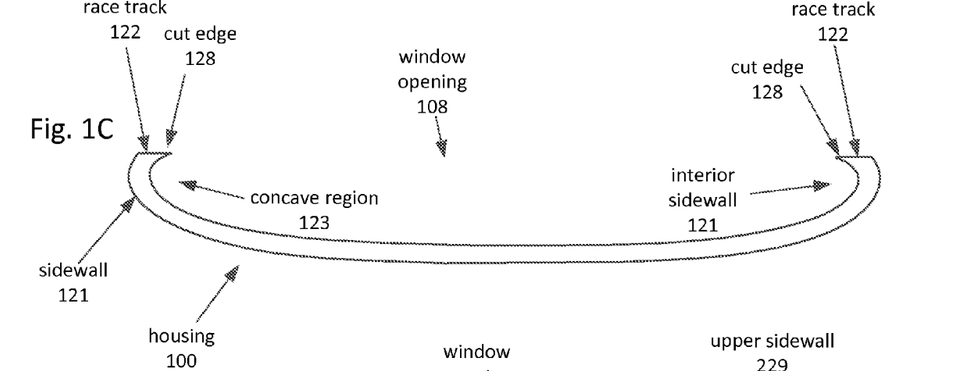
FIG. 1C shows a cross sectional view of a rectilinear housing 100 in accordance with embodiments.

FIG. 1C shows a cross sectional view of the housing 100 highlighting the nature of the undercut geometry. Although in general the inner cross sectional shape of the housing 100 may be the same or different from the external cross sectional shape of the housing 100, the interior shape of housing 100 substantially conforms to the outer shape of housing 100. The housing 100 can be formed having an undercut geometry with curvature that more easily receives the hand of a user (e.g., form fits). In particular, an interior wall of housing 100 substantially conforms to the shape of an exterior wall of housing 100. More specifically, side wall 121 (both interior and exterior) is rounded and curved inwardly to form a concave undercut region 123 formed at an upper portion of the side wall 121 in proximity to cut edge 128. In the example of FIG. 1C, by undercut it is meant that the side wall 121 curves back inwardly towards the interior of the housing 100.

Figure 2A:
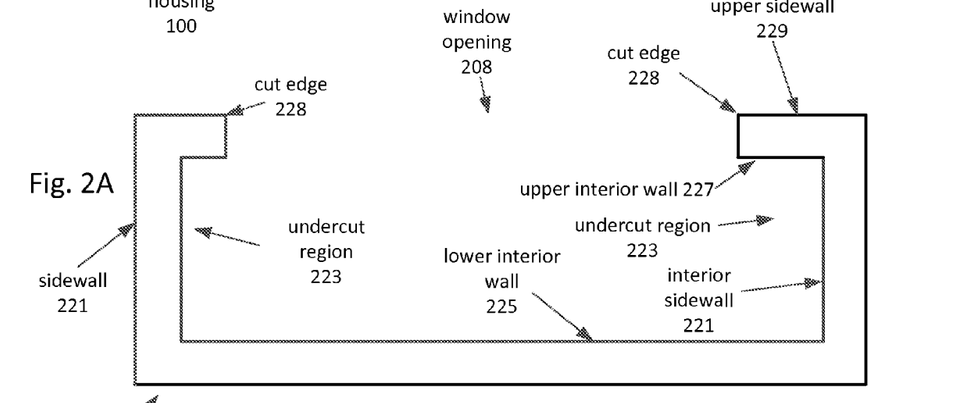
FIG. 2A shows a cross sectional view of a rectilinear housing 200 in accordance with embodiments.

FIG. 2A shows a cross sectional view of a rectilinear housing 200 in accordance with embodiments, highlighting the nature of the undercut geometry. The rectilinear housing 200 has flat surfaces, such as a flat interior sidewall 221. Although in general the inner cross sectional shape of the housing 200 may be the same or different from the external cross sectional shape of the housing 200, the interior shape of housing 200 substantially conforms to the outer shape of housing 200. The housing 200 can be formed having an undercut geometry with straight lines that easily receives the hand of a user. In particular, an interior wall of housing 200 substantially conforms to the shape of an exterior wall of housing 200. More specifically, side wall 221 (both interior and exterior) is has straight edges disposed at right angles to inwardly to form an undercut region 223 formed at an upper portion of the side wall 221 in proximity to cut edge 228 and below upper interior wall 227. In the example of FIG. 2A, by undercut it is meant that an upper portion 229 of the side wall 221 extends back inwardly towards the interior of the housing 200. The upper portion 229 of the side wall 221 extends across a portion of the housing, ending at a cut edge 228. There can also be a cut edge 228 on the opposite side of the housing extending from the opposite interior side wall 221 and forming another undercut region 223. One or both of the cut edges 228 define a window opening 208.

Figure 2B:
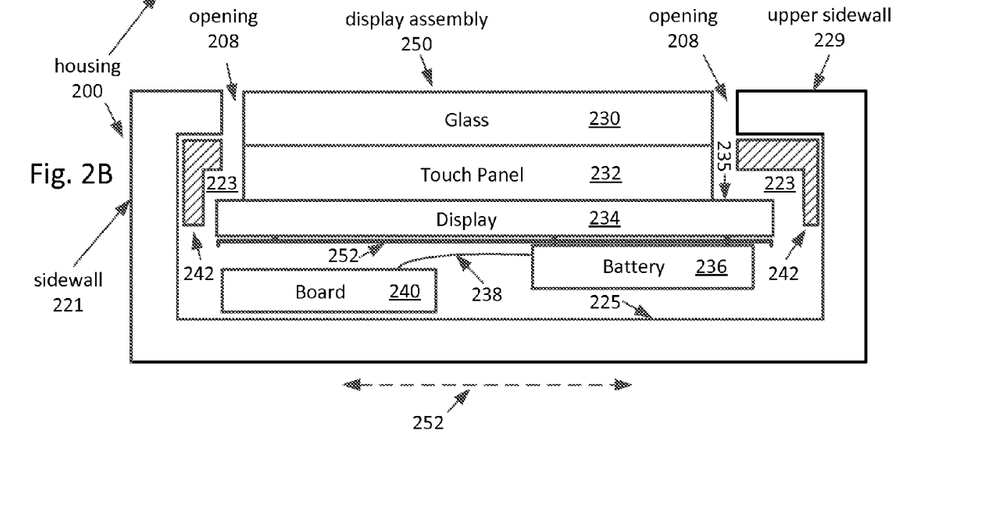
FIG. 2B shows a cross sectional view of a rectilinear housing 200 with device components disposed therein in a final assembly configuration in accordance with embodiments.

FIG. 2B shows a cross sectional view of a rectilinear housing 200 with device components disposed therein in a final assembly configuration in accordance with embodiments. A display assembly 250, which includes glass 230, a touch panel 232, display 234, and battery 236, is located in the interior of the housing 200. The housing 200 should be small, e.g., to comfortably fit in a user's hand, and it is desirable to reduce or minimize the sizes of many of the components of the device 100. For example, the display 234 has a border region in which there are no display pixels. The border region is also referred to herein as a ledge or driver ledge 235. At least a portion of the ledge contains drivers for the pixels, but there is no need for the ledge 235 to be visible to users. The ledge can be asymmetric, e.g., with a larger ledge 235 area on one side of the display 234 than on the other three sides. The ledge can be covered by the glass 230, but that solution leads to enlargement of the glass 230 to maintain symmetry, as symmetry is desirable for aesthetic reasons. For example, if the larger portion of the ledge 235 is under the glass in the area of the button 114 in FIG. 1A, then the glass area in the opposite region labeled 108 should be of the same size as the area around the button 114 to achieve a symmetric design. However, extending the size of the region 108 in that way can undesirably increase the size of the device 100. An alternative solution that involves different placement of the display is described herein.

In one or more embodiments, the ledge 235 of the display 234 is located in an undercut region 223, e.g., below the horizontal inward extensions 244 of the housing 200. Placing the display in a position such as that shown in FIG. 2B, with at least a portion of the display extending into an undercut region 223, results in the driver ledge 235 being hidden from a user's view by the upper sidewall 229. Thus, the display 234 and/or glass 230 need not be enlarged to maintain symmetry, because the large portion of the ledge 235 is covered by the housing, and not visible to a user. Other sides of the display 234 can also be located in undercut regions 223 on other sides of the device. The description herein focuses on a single undercut region 223 for simplicity of explanation, but different portions or sides of the display 234 can be located under two or more undercut regions 223, given sufficient space to articulate the display 234 into the undercut regions 223.

As a result of placing a portion of the display 234 in the undercut region 223, the display assembly 250 is larger than the window opening 208 in at least one dimension 252, such as a largest lateral dimension of the housing 200, and therefore does not fit through the opening 208 when inserted in a direction perpendicular to the housing 200. The display assembly 250 can therefore be inserted into the housing 200 in a tilted configuration that enables the assembly 250 to pass through the window opening 208 to reach a final position in which the display assembly 250 is in a desired orientation inside or partially inside the housing 200. In one example, in the final position, the display assembly is in a horizontal or nearly horizontal orientation in relation to a horizontal axis 250 of the housing 200. Note that the drawings are not to scale, and spaces between components are shown in proportions that are appropriate for illustration. For example the space between the display assembly 250 and the housing 200 may be smaller than that shown by the window openings 208 in FIG. 2B. The components can be adjacent or nearly adjacent to each other, with less (or more) distance between components than is shown in FIGS. 2B-3C.

Figure 3A:
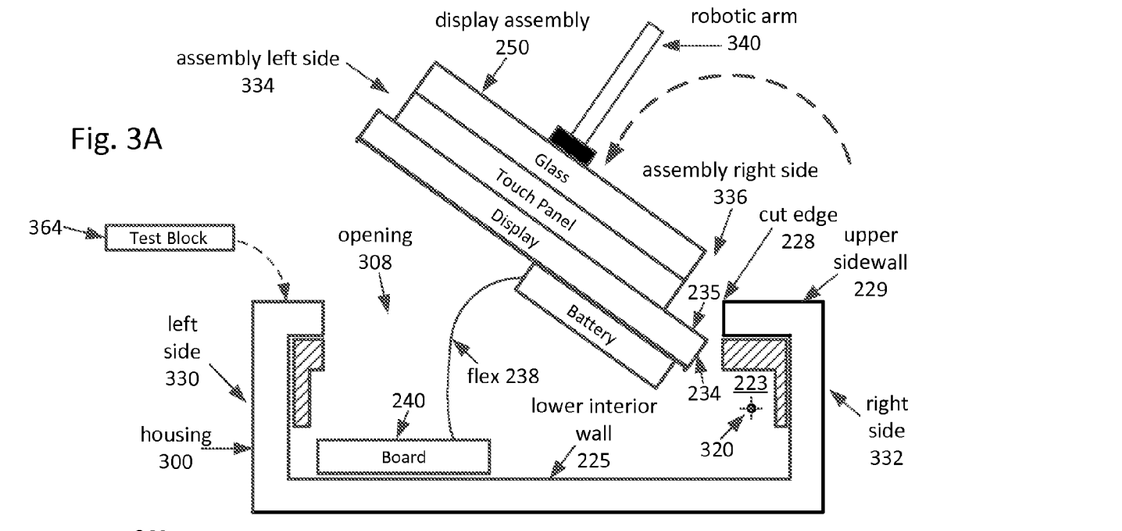
FIGS. 3A-3C show articulation of a display assembly in a tilted configuration in accordance with embodiments.
Figure 3B:
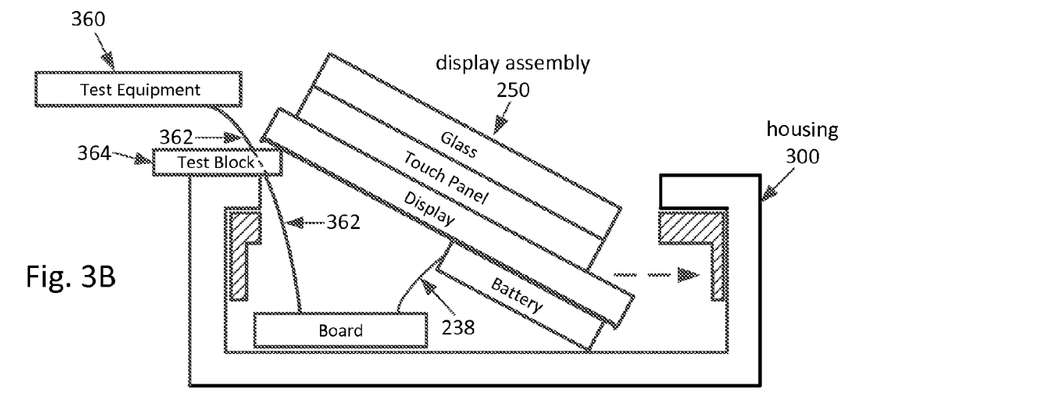
Figure 3C:
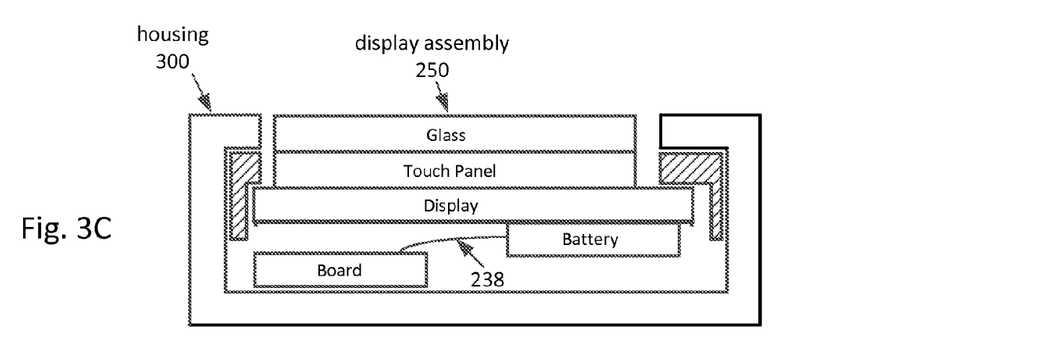

FIGS. 3A-3C show articulation of a display assembly in a tilted configuration in accordance with one or more embodiments. The display assembly 250 is articulated from an initial position such as that shown in FIG. 3A or a horizontal position (not shown) into a tilted configuration such as that shown in FIG. 3B. The device components can be tested at the position shown in FIG. 3B, as described below. The assembly and/or testing can be performed by a robotic machine, which can articulate the assembly using a robotic arm 340 that temporarily attaches to the assembly 250. In a tilted configuration such as that shown in FIG. 3B, the assembly 250 can be articulated in a tilting motion so that the right-side edge of the display, which includes the driver ledge 235, is inserted into the undercut region 333.

In one example, the assembly 250 can initially be positioned horizontally in an upside-down orientation on a flat surface near the housing, e.g., on a table next to the housing. The assembly's right side thus faces to the left because the assembly is upside-down, and is therefore initially adjacent to the housing's right side. To begin insertion of the assembly 250 into the housing 200, the assembly 250 is tilted upward in a revolving motion around an axis indicated by a pivot point 320. In this example, the assembly's left side 334, which is initially the farthest side of the assembly from the housing, moves up and revolves about the axis at the point 320 toward the left side 330 of the housing, as shown in FIG. 3A. This rotation can be performed by, for example, a robotic arm 340 temporarily attached to the assembly 250. The pivot point 320 is a conceptual location shown for illustrative purposes to describe the orientation and motion of the assembly 250. In one embodiment, the pivot point 320 is located in the undercut region 223 into which the assembly 250 is inserted. The pivoting of the assembly 250 does not necessarily follow a single fixed pivot point through the entire range of motion. The pivot point 320 can move while the assembly 250 is tilting, e.g., when the assembly 250 is moved to the right so that the edge of the display is positioned in the undercut region 223. Note that terms describing orientation, such as left, right, upper, lower, horizontal, vertical, and the like, are relative to the housing 200 or assembly 250.

In one embodiment, after being tilted through the opening 308 and into the interior of the housing 300, the assembly 250 is moved to the right along a horizontal axis, as shown in FIG. 3B. The assembly can then be tilted further toward the bottom of the housing 300 and, if needed, further moved to the right, so that the edge of the display is positioned in the undercut region 333 and the display assembly is in the final position shown in FIG. 3C. If needed, the assembly can also be moved to the left as part of the insertion process to reach the final position shown in FIG. 3C. In one embodiment, the display assembly 250 snaps into the final position when a downward force is applied to the top side of the assembly 250. In one or more embodiments, L-shaped frame features 242, which are shown in the undercut regions 223 of FIG. 2B, can be, for example, part of a metal frame that adds rigidity to the housing 200. The L-shaped frame features 242 can be tilted into position in the undercut regions 223 using a tilting motion as described above for the display assembly 250. In one example, the frame features 242 are formed as edges of a single frame, which is inserted through the window opening 208, and tilted and moved horizontally as needed to arrive at a position in which the frame features 242 (e.g., edges of the frame) are located in the undercut regions 223. As shown in FIG. 2B, one of the frame features 242, which corresponds to one side rail of a metal frame, is located in the undercut region 223 between the housing 200 and the driver ledge 235 of the display 234. The frame features 242 thus occupy a portion of the undercut region 223 and reduce the size of the undercut region available for the display 234 under the upper interior wall 227 by the thickness of the upper (horizontal) segment of each feature 242 in the vertical direction, and reduce the size of the undercut region to the side of the interior sidewall 221 by the thickness of the side (vertical) segment of each feature 242 in the horizontal direction.

In one embodiment, the battery 236 is connected to the display assembly 250, e.g., via a frame 252 connected to the lower surface of the display 234 and to the upper surface of the battery 236, so that the battery 236 tilts along with the assembly 250 as the assembly 250 is being inserted into the housing 200. In one example, the battery 236 is connected to the frame on which the L-shaped frame features 242 are formed. In a tilted configuration, with the battery 236 connected to the lower surface of the display assembly 250, the assembly 250 and/or the frame on which the L-shaped frame features 242 are formed can be tilted into a smaller housing (e.g., with a shorter interior sidewall 221 or smaller undercut region 223) than can be achieved in an alternate configuration in which the battery 236 is connected to the lower interior wall 225 of the housing 200.

In another embodiment, as mentioned above, the battery 236 can be connected to the lower interior wall 225 instead of to the display assembly 250. However, if the battery 236 is connected to the lower interior wall 225 when a display assembly (without the battery) is tilted into the housing 200, then the battery 236 can be a barrier to insertion of the display assembly. Depending upon the specific dimensions of the housing and components, if the battery 236 is connected to the lower interior wall 225, there can be insufficient space to allow the display assembly 250 to be tilted into its final horizontal or nearly horizontal position relative to the device cross section shown in FIG. 2B. However, the dimensions of the housing and components can be such that the display assembly can be tilted into the housing 200 without colliding with fixed-position battery 236 connected to the housing 100, in which cases the battery 236 can be connected to the housing 200, e.g., to the lower interior wall 225, instead of being connected to the display assembly 250.

In one or more embodiments, a flexible electrical cable 238 extends from the battery 236, and is connected to a circuit board 240, e.g., a main logic board, as part of an assembly and testing process in which the display assembly 250 is tilted into the housing 200 by the process described above. To connect the cable 238 to the board 240, the cable can be snaked (e.g., routed) into a position near the board before sliding the display assembly into the housing, as shown in FIG. 3A. The cable can then be soldered down to the board, and the display assembly 250 can be articulated and tilted into the housing to arrive at the configuration shown in FIG. 3C.

Figure 4:
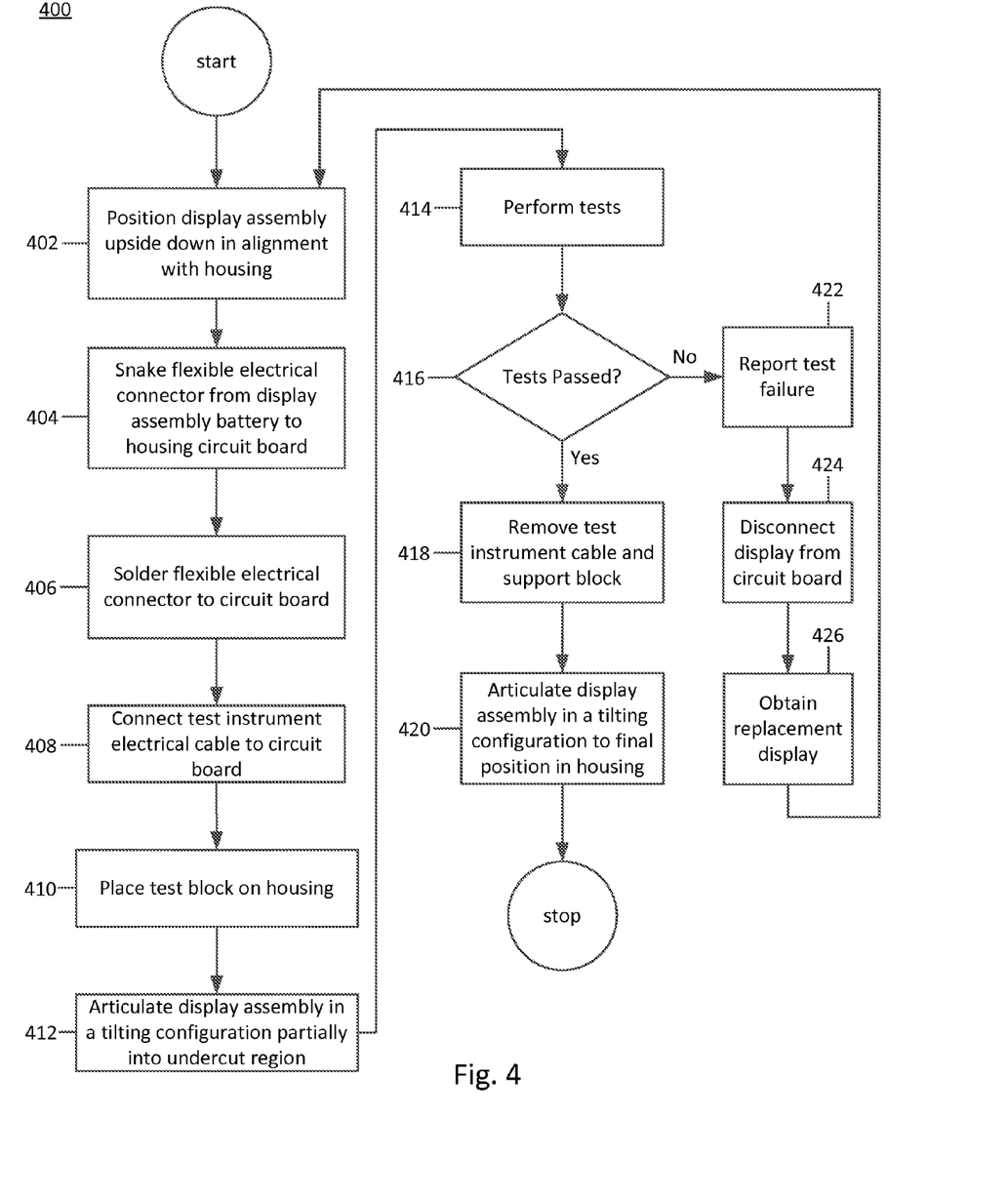
FIGS. 4 and 5 illustrate device assembly and testing processes in accordance with one or more embodiments.

FIG. 4 illustrates a device assembly and testing process in accordance with one or more embodiments. The process of FIG. 4 can be performed by, for example, a robotic assembly and testing machine. The robotic machine can include a control computer, and the assembly and testing process can be encoded on machine-readable instructions that are provided to, loaded, and executed by a processor in the control computer. The process begins at block 402, which positions the display assembly, such as the assembly 250 of FIG. 2B, in an upside-down orientation and in alignment with a housing, such as the housing 200 of FIG. 2B. The alignment can be such that an edge of the display assembly and a corresponding edge of the housing are positioned closely together, so that the display assembly can be rotated and tilted about an axis 320 located near the closely positioned edges, and eventually tilted into the housing as shown in FIGS. 3A-3C. Block 404 snakes (e.g., routes) a flexible electrical connector 238 from the display assembly's battery to a circuit board mounted in the housing. Block 406 solders the flexible electrical connector 238 to the circuit board. In other embodiments, the connector 238 can be connected to the circuit board using techniques other than soldering, such by connecting a plug connector other type of solderless connector, or the connector 238 can be connected to different components, e.g., directly to the display 234 instead of being connected to the circuit board 240. Block 408 connects one or more electrical testing connectors 362 such as wires, ribbon cables, flex connectors, or the like, from test equipment 360 to the board 240 and/or other components of the portable electronic device. In other embodiments, the test equipment 360 can use different types of interfaces; the test connector 362 is shown as one example of a testing interface configuration.

Block 410 places a physical test block 364 on an upper left sidewall of the housing 200. In one example, the test block 364 rests on the upper left sidewall without being attached to the housing. In other embodiments, the block 364 can be attached to a robotic test device, can be fastened temporarily to the housing 300, or can be omitted if the display assembly 250 can rest directly on the upper left sidewall of the housing 200 or be supported by a different technique, e.g., be held in position during testing by a robotic arm 340.

Block 412 articulates the display assembly in a tilted configuration around the aforementioned axis 320 as shown in FIG. 3A, stopping the articulation when the display assembly is partially tilted into an undercut region of the housing, as shown in FIG. 3B. In one embodiment, the tilting stops when an assembly left side 334 touches the test block 364 and/or when the bottom of the display assembly 250 (e.g., the lower corner of the battery 236) touches the housing 300. The test block 364 supports the display assembly 250 in the position at which the articulation stopped in block 412, so that testing can be performed while the display assembly 250 is connected to the circuit board but the display assembly 250 has not yet blocked access to the circuit board. The testing connector 362 passes through an open space between the display assembly 250 and the housing 300. The open space can be, for example, a space adjacent to or behind the test block 364, or an opening in the test block 364. Block 414 performs the tests using test equipment 360. For example, block 414 can send commands or instructions to the test equipment 360 to cause the test equipment to send test instructions to the circuit board 240 and/or display 234, to test voltage levels and functions of the circuit board 240, display 234, or other components, and to receive results from the tested components. The test equipment 360 processes the responses from the circuit board and other components and generates test results. When the tests are complete, block 416 determines whether the tests passed or failed, e.g., by retrieving the test results from the test equipment 360. If the tests failed, block 422 reports a test failure, and appropriate action is taken to handle the failure, as described below.

In one embodiment, as shown in FIG. 4, if block 416 determines that the tests failed, then block 422 reports the failure, e.g., to an error log, an operator, or the like, and block 424 disconnects the display assembly from the circuit board by, for example, unsoldering or unplugging the electrical connector referenced in block 406, or by other actions appropriate for the type of connector used to connect the display assembly 250 to the circuit board. Block 424 can also remove the display assembly 250 from the housing and place the removed display assembly 250 in an appropriate location such as a bin for discarded parts. In other embodiments, block 424 can remove one or more particular components of the display assembly, such as the display 234, touch panel 232, and/or battery 236, from the display assembly, so that the particular component(s) can be replaced while re-using other components of the display assembly 250. For example, if the test results indicate that the display 234 is not operating correctly, then the display 234 can be removed from the assembly 250, so that the display 234 can be replaced with a different display component that performs the same function as the display 234. If the test results do not identify a particular component, then the display assembly 250 can be removed and replaced.

Block 426 obtains replacement(s) for the component(s) removed at block 424, e.g., from a parts bin or other parts storage facility, and causes the assembly and testing process to repeat using the replacement component(s) by transferring control to block 402. The replacement component(s) obtained at block 426 may be, for example, a replacement for the display assembly 250, or replacements for one or more of the components of the assembly 250, such as the display 234, touch panel 232, and/or battery 236, or other appropriate components. Otherwise, if block 416 determines that the tests passed, block 418 removes the test instrument cable 362 and test block 364, and block 420 articulates the display assembly in the tilted configuration to the final position in the housing, as shown in FIG. 3C. Further details of articulating the display assembly to the final position are given below with reference to FIG. 5.

Figure 5:
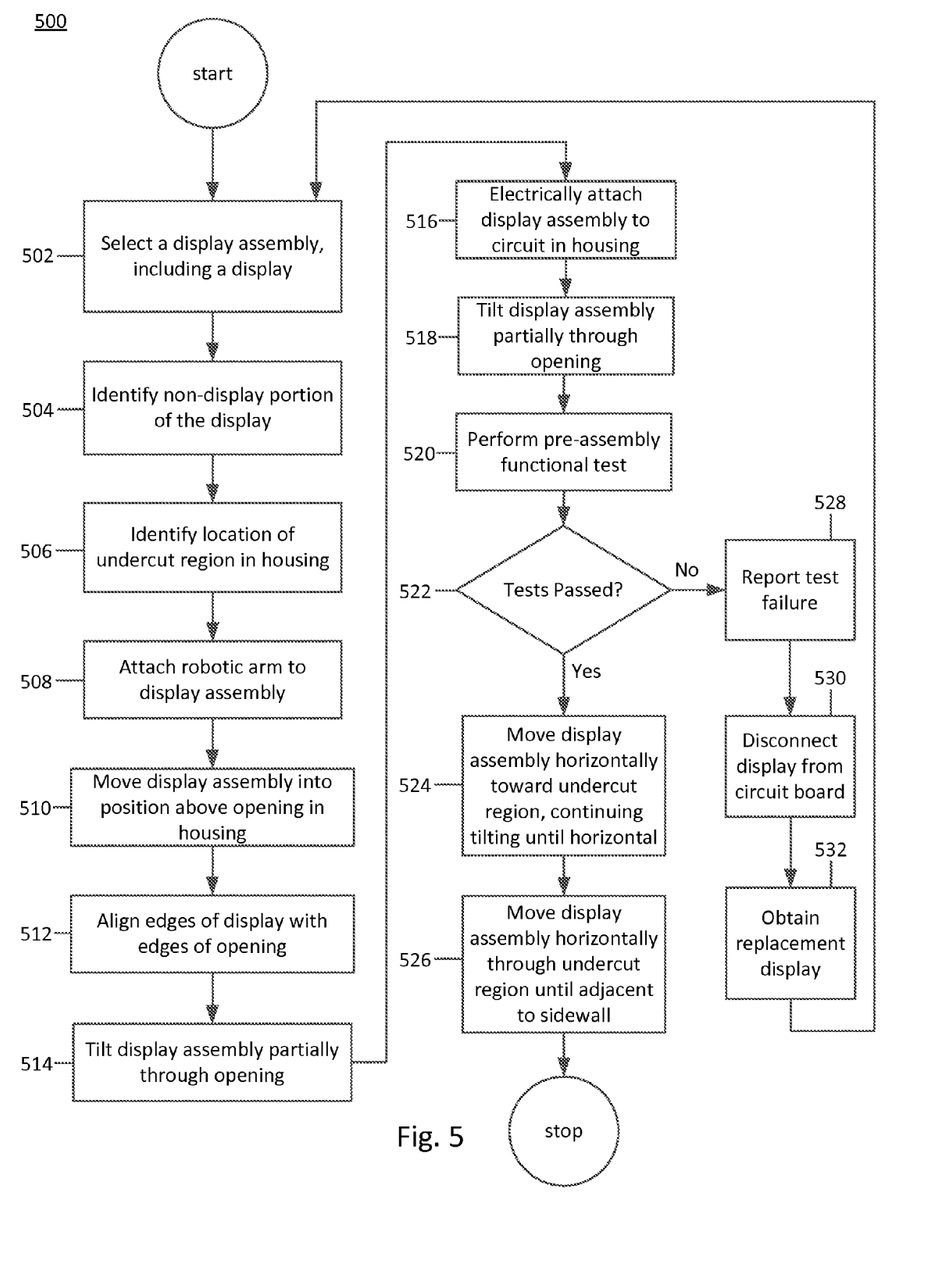

FIG. 5 illustrates a device assembly and testing process in accordance with one or more embodiments. The process of FIG. 5 can be performed by, for example, a robotic assembler. The robotic assembler can include a control computer, and the assembly and testing process of FIG. 5 can be encoded on machine-readable instructions that are provided to, loaded, and executed by a processor in the control computer to cause the robotic assembler to assemble and test a portable computing device having a housing 200 and a display assembly 250. The process begins at block 502, which selects a display assembly 250, such as the next available display assembly from a supply of display assemblies, e.g., a parts bin. Block 504 identifies a non-display portion of the display portion 234 of the display assembly 250. The non-display portion can be, for example, a driver ledge 235 of a flat panel LCD display, as described above. Block 506 identifies a location of the undercut region 223 in the housing. The undercut region can be the region between an upper interior wall 227 and a lower interior wall 225 on a specified end of the housing 200. The specified end can be, for example, the end having the upper interior wall 227 of greatest width (e.g., distance between the cut edge 228 and the interior sidewall 221) in comparison to the upper interior wall(s) of other side(s) of the housing 200. In another example, the specified upper interior wall 227 can be identified as the upper interior wall having dimensions that accommodate the driver ledge 235 of the display 234.

If an L-shaped frame feature 223 is present in the housing 200, then block 506 identifies the location of the undercut region 223 as the region between the frame feature 242 and the lower interior wall 224 on the specified end of the housing 200. Block 508 attaches a robotic articulation arm 340 to a protective layer of the display assembly, e.g., using a mechanical grip at one end of the arm 340. Block 510 moves the display assembly into a position above the opening in the housing the articulation arm 340. Block 512 uses the articulation arm 340 to align edges of the display with edges of the opening. For example, a display with four edges can be aligned with four corresponding edges of an opening by moving the display into a position in which the upper, lower, left, and right edges of the display are parallel to the respective upper, lower, left, and right edges of the opening.

Block 514 tilts the assembly 250 partially through the opening in the housing by, for example, using the arm 340 to revolve the assembly 250 about the axis 320, stopping after the right side 225 of the assembly passes through the opening, and before the left side 334 of the assembly enters the opening. Block 516 electrically attaches the display assembly to a circuit in the housing, e.g., by soldering the flex 238 to the board 240. The electrical attachment can be performed at other times instead, e.g., prior to block 514. Block 518 uses the arm 340 to tilt the display assembly through the opening 308 by revolving the display assembly 250 around an axis 320 located in the undercut region 223 until the display assembly 250 rests on a lower surface 225 of the housing and on a test block 364 located on an upper surface of the housing. The robotic assembler can place the test block 364 on the upper left sidewall of the housing. The assembler can move the display assembly in a horizontal direction as well, so that the non-displaying portion (e.g., ledge 235) occupies at least a portion of the undercut region.

Block 520 performs a pre-assembly functional test on the display assembly. Block 520 attaches a test cable or other test apparatus to the circuit board to test the components of the portable computing device, including the board 240, the display 234, the touch panel 232, and/or the battery 236. Block 522 determines if the functional test passed, and then disconnects the test connector 362. In response to successful completion of the functional test, block 524 removes the test block 364 and moves the display assembly 250 in a horizontally direction toward the undercut region and continues the tilting until the assembly 250 is in a horizontal position and at least a portion of the assembly 250 is in the undercut region 223. At block 526, the robotic assembler further moves the display assembly horizontally through the undercut region until the display assembly is adjacent to a right-side interior sidewall 221. If the functional test failed, block 528 reports the failure, block 530 disconnects the display assembly from the circuit, block 531 obtains a replacement display assembly, and replaces the existing display assembly 250 with the replacement display assembly. At block 532, the assembler repeats the moving, aligning, tilting, and testing of blocks 502 through 522 using the replacement display assembly. The process of FIG. 5 fully inserts the replacement display assembly into the housing at blocks 524 and 526 when the pre-install functional test is successfully completed.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

What is claimed is:

1. An assembly method suitable for assembling a portable electronic device having a housing with an undercut portion, comprising:
   aligning a non-display portion of a display assembly with the undercut portion of the housing, the display assembly comprising a display, a protective top layer covering a top side of the display portion and the non-display portion and a battery module attached to an underside of the display assembly;
   electrically connecting the battery module to a circuit previously installed in the housing;
   angling the display assembly in relation to a front opening of the housing in a tilted configuration such that the non-display portion is partially inserted into the undercut portion of the housing; and
   in the tilted configuration:
   performing a pre-install functional test on the display assembly; and
   fully inserting the display assembly into the housing only when the pre-install functional test is successfully completed.

2. The method of claim 1, further comprising:
   disconnecting the battery module from the circuit in response to failure of the pre-install functional test;
   obtaining a replacement component for at least one component of the display assembly; and
   replacing the at least one component of the display assembly with the replacement component.

3. The method of claim 2, further comprising:
   repeating the aligning, electrically connecting, angling, and testing using the display assembly having the replacement component; and
   fully inserting the display assembly having the replacement component into the housing only when the pre-install functional test is successfully completed.

4. The method of claim 1, further comprising:
   electrically connecting a test instrument cable to the circuit in the housing.

5. The method of claim 4, wherein performing a pre-install functional test on the display assembly comprises:
   sending one or more test instructions to the circuit in the housing via the test instrument cable;
   receiving test results from the circuit; and
   determining, based upon the test results, whether the functional test is successfully completed.

6. The method of claim 1, further comprising:
   placing an object on the housing at a location between the housing and the display assembly; and
   supporting the display assembly in the tilted configuration with the object during the pre-install functional test.

7. The method of claim 1, wherein aligning a non-display portion of a display assembly with the undercut portion of the housing comprises:

attaching an articulation arm to the protective top layer of the display assembly;

moving the display assembly into a position above the opening in the housing the articulation arm; and aligning edges of the display with edges of the opening.

8. The method of claim 1, wherein angling the display assembly comprises tilting the display assembly through the opening around an axis located in the undercut portion until the display assembly rests on a lower surface of the housing and on a test block located on an upper surface of the housing.

9. The method of claim 8, wherein fully inserting the display assembly comprises:

removing the test block; and moving the display assembly horizontally toward the undercut portion and continuing the tilting until the assembly is in a horizontal position, and at least a portion of the assembly is in the undercut portion.

10. The method of claim 1, wherein the non-display portion comprises a driver ledge.

11. The method of claim 10, wherein the driver ledge extends into the undercut portion, and the housing is at least partially formed from an opaque material that covers the ledge.

* * * * *

UNITED STATES PATENT AND TRADEMARK OFFICE
CERTIFICATE OF CORRECTION

PATENT NO. : 8,893,373 B2  
APPLICATION NO. : 13/594767  
DATED : November 25, 2014  
INVENTOR(S) : Rothkopf et al.

Page 1 of 1

It is certified that error appears in the above-identified patent and that said Letters Patent is hereby corrected as shown below:

In the Claims:

Column 14, line 21 Claim 1, line 7 "display portion and" should read --display and--.

Column 15, line 4 Claim 7, line 7 "housing the articulation" should read --housing using the articulation--.

Signed and Sealed this
Thirty-first Day of March, 2015

Michelle K. Lee
*Director of the United States Patent and Trademark Office*